United States Patent [19]

Shieman et al.

[11] 3,876,024

[45] Apr. 8, 1975

[54] MOTORIZED VEHICLE FOR MOVING HOSPITAL BEDS AND THE LIKE

[75] Inventors: Bryan M. Shieman, 23800 Ravensbury, Los Altos Hills, Calif. 94040; Charles S. Mitchell, Palo Alto, Calif.

[73] Assignee: Said Charles S. Mitchell to said Bryan M. Shieman

[22] Filed: Dec. 7, 1972

[21] Appl. No.: 312,808

[52] U.S. Cl. .................. 180/19 R; 5/328; 280/35
[51] Int. Cl. ............................... B62d 51/04
[58] Field of Search ............ 180/11, 12, 14 R, 19 R; 280/34 R, 34 B, 35, 3; 5/328; 214/147 G, 515; 294/67 BB

[56] References Cited
UNITED STATES PATENTS

| | | | |
|---|---|---|---|
| 1,903,431 | 4/1933 | Abbe | 280/34 R |
| 2,599,717 | 6/1952 | Menzies | 5/328 |
| 2,846,018 | 8/1958 | Puckett | 180/14 R X |
| 3,049,253 | 8/1962 | Cabral | 180/14 R X |
| 3,465,841 | 9/1969 | Pulskamp et al. | 180/19 R X |

FOREIGN PATENTS OR APPLICATIONS

| | | | |
|---|---|---|---|
| 1,939,641 | 9/1970 | Germany | 280/35 |
| 1,041,210 | 12/1955 | Germany | 5/328 |

*Primary Examiner*—Albert J. Makay
*Assistant Examiner*—Leslie J. Paperner
*Attorney, Agent, or Firm*—Stephen P. Fox

[57] ABSTRACT

A vehicle includes first and second telescoping wheeled carriage assemblies which are dimensioned to fit under a hospital bed, for example. The first carriage assembly includes a traction wheel which is driven by a battery powered electric motor. The second carriage assembly supports brackets for rigidly attaching the vehicle to a bed, and a removable, tiltable control handle for operating the electric motor through a control circuit.

17 Claims, 14 Drawing Figures

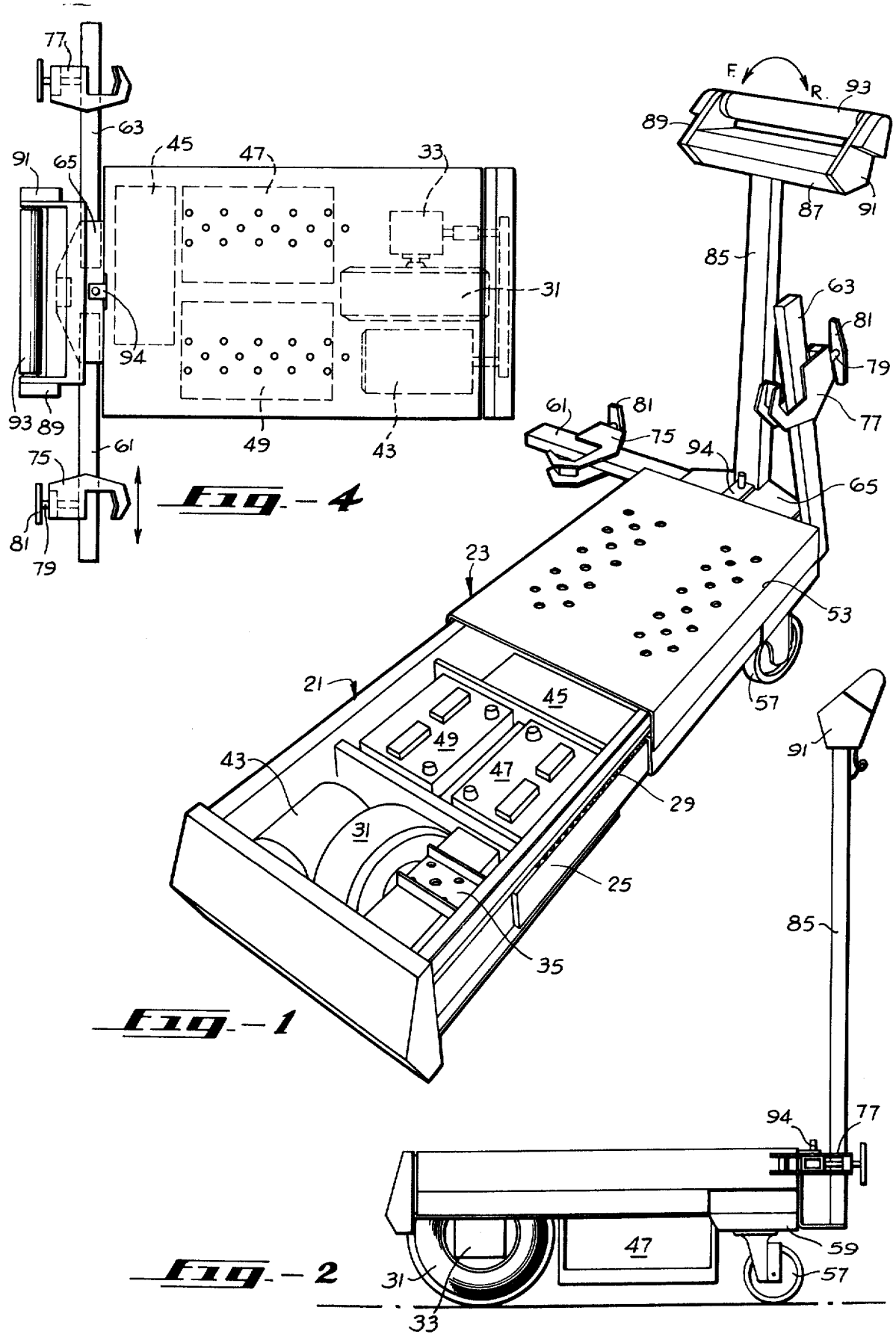

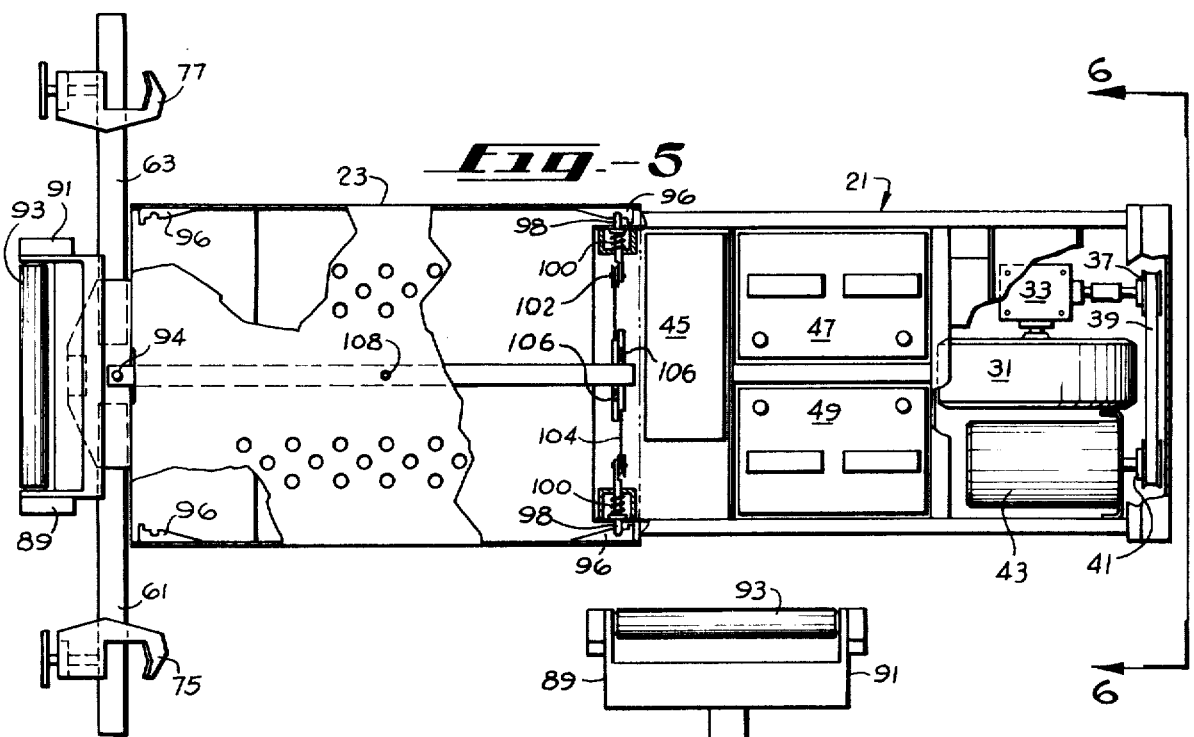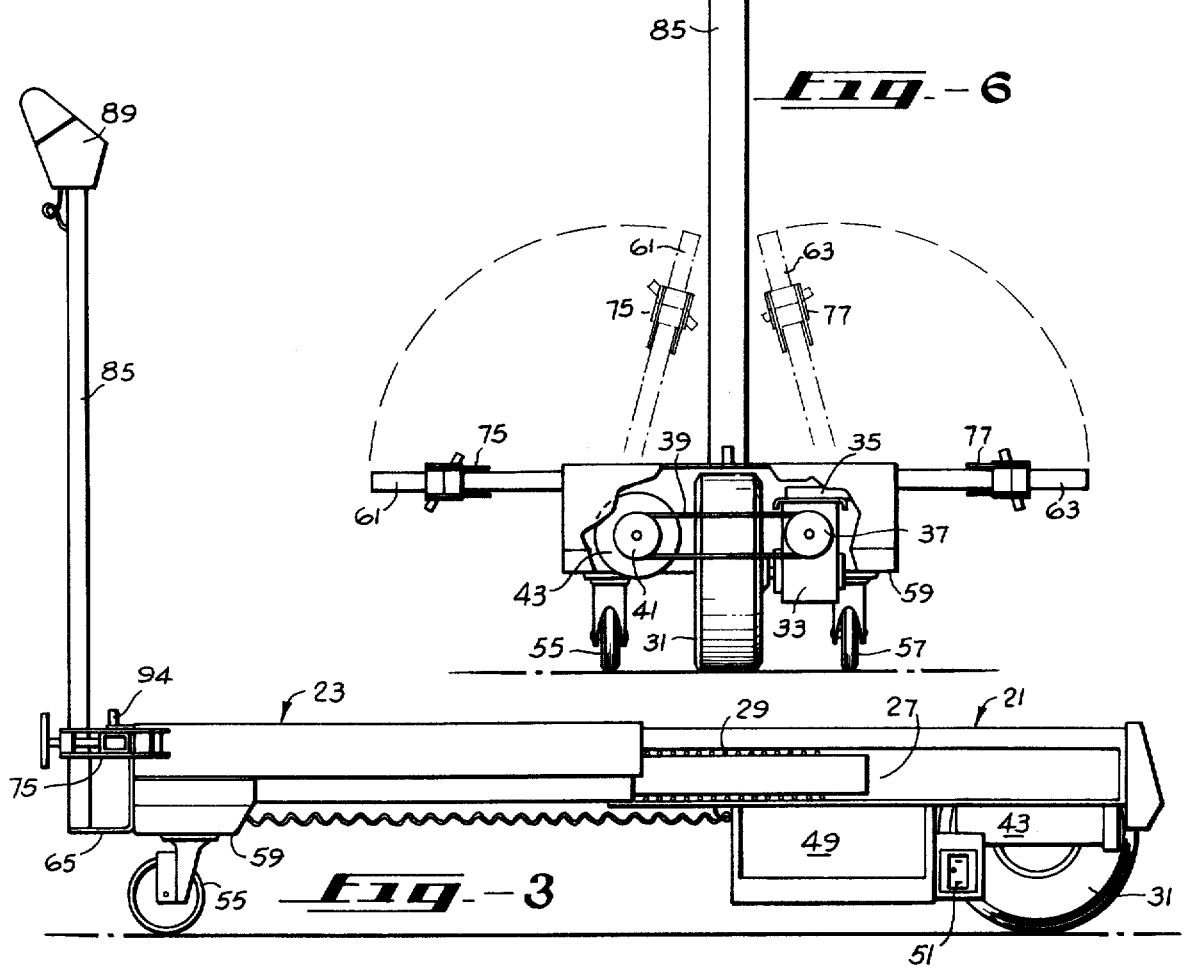

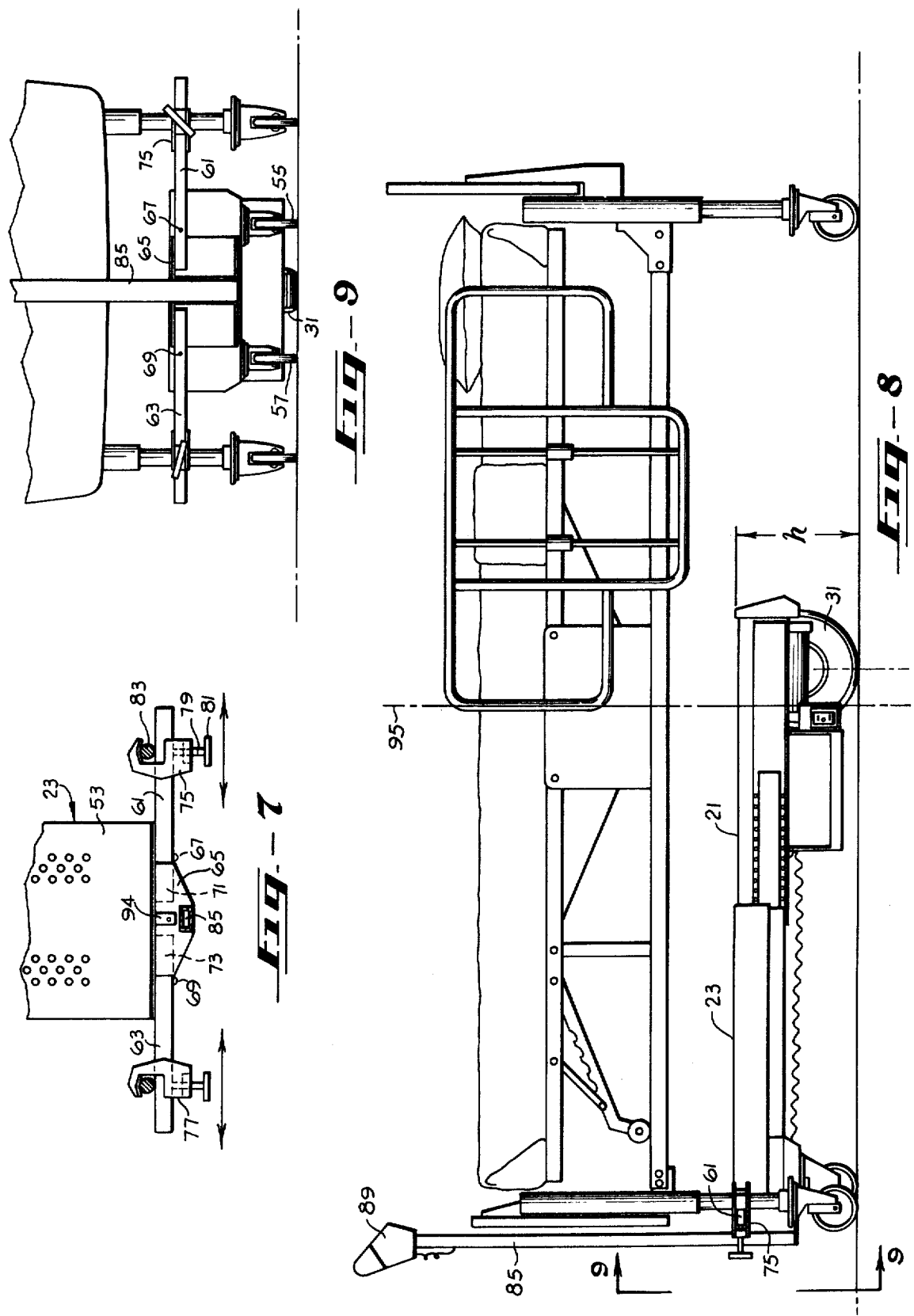

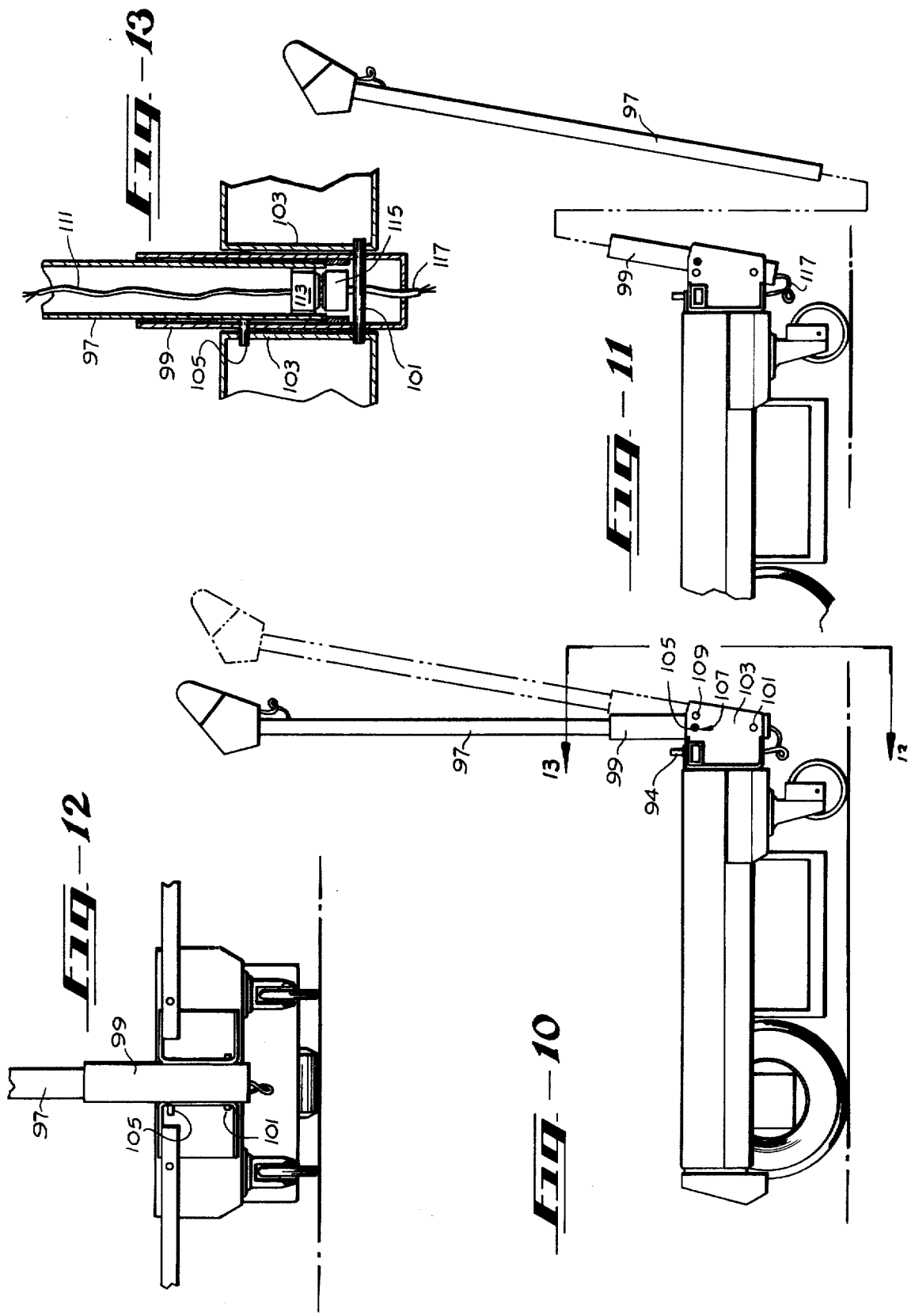

MOTORIZED VEHICLE FOR MOVING HOSPITAL BEDS AND THE LIKE

BACKGROUND OF THE INVENTION

The present invention relates generally to a vehicle for moving heavy mobile equipment in confined areas. In hospitals, for example, beds, food carts, supply carts and other hospital equipment are commonly moved from room to room, floor to floor, down long corridors, and onto and off of elevators. When a hospital bed is to be moved with a patient in it, the bed is heavy, cumbersome and difficult to manuever around corners and into and out of small places. These problems are compounded when bulky and heavy equipment is attached to the bed for the purpose of holding the patient in suspension or traction, for example. Almost always, two persons are required to move the bed, particularly around corners, and even then the task is difficult. Many hospitals have carpeted floor surfaces, which increase the difficulty of transporting the bed.

Often, the elevators in which hospital beds are transported are not much longer than the beds themselves. Typically, the clearance at the end of each bed to the elevator walls is on the order of 6 inches or less. This clearance is even less when suspension or traction equipment is attached to the bed. With such a small clearance, manuevering of the bed into the elevator is usually accomplished through the slow, careful manual efforts of two persons.

SUMMARY OF THE INVENTION

The present invention provides an electrically powered vehicle which permits a single operator to move a heavy wheeled device, such as a hospital bed, around sharp corners, into and out of elevators, and over carpeted floors with minimum effort by merely guiding it. The invention in its illustrated embodiment includes a first carriage assembly which telescopes into and out of a second carriage assembly on ball bearing slide members. The tow carriage assemblies are dimensioned to fit under a hospital bed between the legs at one end thereof. The first carriage assembly includes a traction wheel, an electric drive motor, a power transmission, two batteries, and a motor control circuit. The second carriage assembly includes support wheels, and a pair of laterally extendable arms, each with an adjustable clamp for rigidly attaching the vehicle to the legs of a hospital bed, for example. The second carriage assembly also supports a handle assembly for guiding the vehicle and for controlling the speed and direction of the electric motor through the control circuit, thereby to control vehicle speed.

A feature of the present invention is that the two telescoping carriages, when extended in use, permit positioning of the traction wheel near the longitudinal center of a hospital bed. With such placement of the traction wheel, and rigid attachment of the vehicle to legs of the bed, one operator at the control handle can easily guide movement of the bed through tight manuevers. The two telescoping carriages also may be contracted when not in use under a bed, thereby to substantially shorten the overall length of the vehicle and permit it to be moved easily from one bed location to another.

Another feature of the present invention is that the vehicle when in use to move a hospital bed fits almost entirely under vehicle with only the handle assembly extending a few inches beyond the end of the bed. This arrangement permits the bed to be moved easily from floor to floor in hospital elevators that are only inches longer than the bed itself without detaching the vehicle from the bed. In one embodiment, the handle assembly is tiltable away from the bed and is of the "breakaway," removable type. This arrangement permits convenient use of the vehicle to move and position a bed having external equipment such as traction bars mounted on the ends thereof. With the removable handle, the vehichle may be used in elevators where the combined length of the bed and externally mounted equipment consume almost all available elevator space.

BRIEF DESCRIPTION OF THE DRAWINGS

FIG. 1 is a perspective view of the present invention illustrating the telescoping carriage assemblies in their extended position.

FIGS. 2 and 3 are side views of the vehicle illustrating the telescoping carriage assemblies in their contracted and extended positions, respectively.

FIGS. 4 and 5 are top views of the vehicle illustrating the telescoping carriage assemblies in their contracted and extended positions, respectively.

FIG. 6 is a partially cut-away end view of the vehicle taken along the line 6—6 shown in FIG. 5.

FIG. 7 is a top sectional view of a portion of the vehicle shown in FIG. 1.

FIG. 8 is a side view of the vehicle in use under a hospital bed.

FIG. 9 is an end view taken along the line 9—9 of FIG. 8.

FIGS. 10 and 11 are side views of another embodiment of the vehicle illustrating the tiltable, removable control handle assembly.

FIG. 12 is an end view of the vehicle illustrated in FIGS. 10 and 11.

FIG. 13 is an enlarged sectional view of the control handle assembly taken along the line 13—13 in FIG. 10.

DESCRIPTION OF THE PREFERRED EMBODIMENTS

Figure 14:
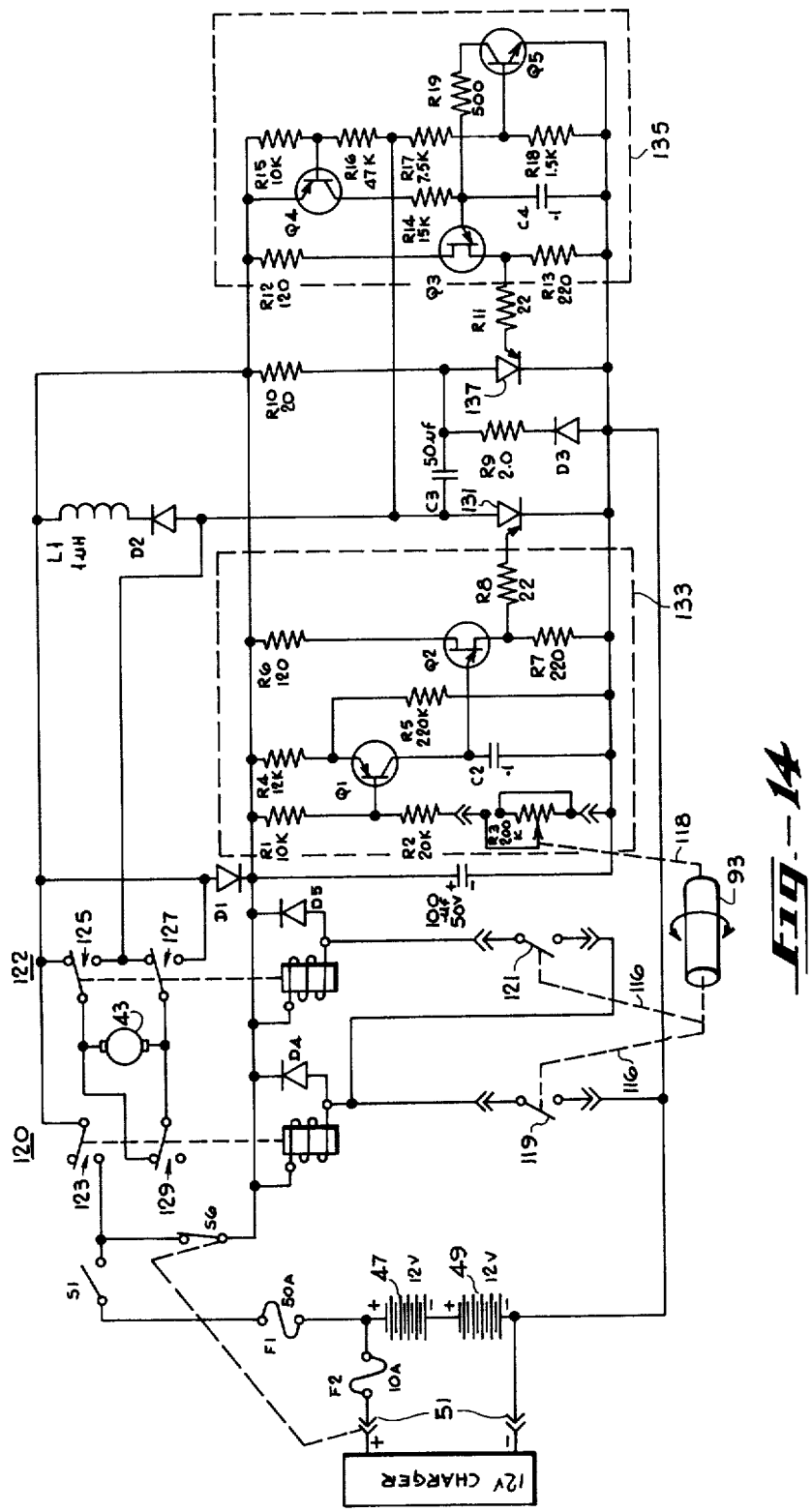
FIG. 14 is a schematic wiring diagram of the motor and control circuitry used in the vehicle.

Referring now to FIGS. 1 – 6, the vehicle comprises a first carriage assembly 21 which telescopes into and out of a second carriage assembly 23. There are provided a pair of longitudinally extendable side support brackets 25, 27, (FIGS. 1 and 3), each bracket having a track member attached to the first carriage assembly 21 and a guide member attached to the second carriage assembly 23. The guide members glide in the track members on ball bearings 29.

The first carriage assembly 21 includes a traction wheel 31 mounted at the forward end of the carriage (as viewed in FIG. 1). Traction wheel 31 is supported at its axle by a power transmission assembly 33 which is rigidly attached to the side frame of carriage 21 by a bracket 35. As shown most clearly in FIG. 6, traction wheel 31 has its axle coupled directly to the output of power transmission 33. Transmission 33 is of the right-angle worm-gear drive type, with the input being the worm gear and the output being the mating gear coupled to the traction wheel. A pulley 37 on the worm gear input is coupled through a belt 39 to another pulley 41 on the shaft of an electric motor 43, which is rigidly supported by brackets on the first carriage assembly 21. The electric motor 43 is of the 24 volt D.C. reversible type, and is electrically coupled through a control circuit contained in housing 45 to a pair of series coupled, 12 volt storage batteries 47, 49, as described in more detail hereinafter. The storage batteries 47, 49, are of the rechargeable type and as shown in FIG. 3, they are mounted on the first carriage assembly 21 below the top plane thereof. An electrical plug 51 is disposed adjacent to the storage battery 49 for connecting the batteries to a source of electrical power during the recharging operation.

The second carriage assembly 23 includes a vented housing 53 formed of sheet metal and attached to the aforementioned side support brackets 25, 27. Carriage assembly 23 is supported on a pair of pivotable casters 55, 57, which are mounted on a cross-member 59. Mounted on the end of the second carriage assembly 23 are a pair of rectangular tubular arms 61, 63. Each of these arms is pivotably mounted, thereby to permit them to be pivoted upward in the manner represented by arm 63 in FIG. 1 and also as shown in phantom in FIG. 6. This arrangement permits the overall lateral dimension of the vehicle to be reduced when it is not in use. When extended laterally, the two arms 61, 63, are rigidly supported in place by a plate member 65 projecting from the end of the second carriage assembly 23. More particularly, as shown in FIGS. 7 and 9, arms 61, 63, pivot on pins 67, 69, respectively. When pivoted to their laterally extended positions the weight of the arms cause the ends 71, 73, to be biased firmly against the underside of plate 65.

A pair of clamps 75, 77, are mounted on arms 61, 63, respectively. Each clamp includes a threaded shaft 79 which iss rigidly attached to a handle 81. Each clamp also includes a J-shaped portion which is configured to receive a post 83 (FIG. 7) disposed perpendicularly to the laterally extending arm on which the clamp is mounted. Post 83 may be the leg of a hospital bed, for example, as described hereinafter. Clamps 75, 77, are also slidable longitudinally along their respective arms 61, 63. In operation, each clamp is moved along its arm to engage a post, and handle 81 is rotated to rigidly clamp the post to the arm.

Also rigidly attached to the end of the second carriage assembly 23 is a handle assembly including a vertically extending rectangular tubular member 85. Mounted on the top of the vertical member 85 is a control handle including a hollow cross-member 87 and a pair of spaced apart side brackets 89, 91. A rod or bar 93 is rotatably mounted on its longitudinal axis between the side brackets 89, 91. Side brackets 89, 91 are configured to define housings at each end of rod 93. One of the housings contains two cams (not shown) attached to a shaft extending from rod 93, and two micro-switches which are operated by the two cams, respectively, when the cams rotate. The other housing contains a rheostat which is also operated by a shaft extending from the end of rod 93. The switches and rheostat are coupled through wires inside cross member 87 and tubular member 85 to the control circuit contained in housing 45 in the first carriage assembly 21. When bar 93 is rotated in the direction labelled F (FIG. 1) one of the two switches and rheostat are actuated to energize motor 43, and thus traction wheel 31, to drive the vehicle in the forward direction. When rod 93 is rotated in the direction labelled R, both switches and the rheostat are actuated to drive the vehicle in the reverse direction. Power applied to the drive motor 43 increases with the angular displacement of control bar 93. Preferably, bar 93 is spring biased against rotation in either direction and has a stable center-off position. This arrangement provides a so-called "dead man throttle" for safe operation of the vehicle.

Typically, when the vehicle is in use, an operator would stand behind the control handle (as viewed in FIG. 1) and face the two carriage assemblies. Control bar 93 serves as a means for guiding the vehicle as well as the electrical control described above.

When the vehicle is not in use, the two arms 61, 63, are privoted upward and out of the way, and the first and second carriage assemblies 21, 23, are telescoped into their contracted position, as shown in FIGS. 2 and 4. The two carriage assemblies are locked together in this position by a spring biased detent mechanism. In preparation for use, a lever 94 is manually operated to release the detent locking mechanism and the first and second carriage assemblies are telescoped apart into their extended position as shown in FIGS. 1, 3 and 5. The movement of the two carriage assemblies 21, 23, into the extended position may be achieved by operating control bar 93 to cause the traction wheel 31 to pull the first carriage assembly 21 out of the second carriage assembly 23. As the two carriage assemblies reach the fully extended position, two locking pins 98 (FIG. 5) slide up the ramps of detent members 96 and engage the notches therein to rigidly lock the two carriages in this position.

With respect to FIG. 5, the four notched ramp members 96 comprising the locking mechanism are mounted on the underside of the vented housing of carriage assembly 23 at the corners thereof. Two pins 98 are mounted on carriage assembly 21 and each pin is biased by spring 100 into the notch of the adjacent one of the ramp members 96. Pins 98 are attached to pulleys 102, which in turn are linked together by a cable 104. Lugs 106 are appropriately attached to the cable and to carriage assembly 21, and located adjacent to lever 94, so that when lever 94 is moved laterally, it pivots on point 108, engages one of the lugs 106 and causes shortening of the cable. As a result, pins 98 are pulled from the notches in detent members 96 and the two carriage assemblies 21, 23, are unlocked. When the two carriage assemblies are in the contracted position, operation of the locking mechanism is similar to that described above, except that lugs 106 are moved by the portion of the lever 94 which is to the left of pivot point 108 (as viewed in FIG. 5).

FIGS. 8 and 9 illustrate the vehicle in use to move a hospital bed. The vehicle is positioned in place by guiding it under power between the legs of the bed at one end thereof, until the laterally extending arms 61, 63, butt against the legs of the bed. Thereafter, clamps 75, 77, are moved along their respective arms to engage the legs in the manner shown in FIG. 7, wherein posts 83 represent the legs. The fact that clamps 75, 77, are laterally adjustable permits them to accommodate a wide range of spacings between the legs of the bed. The handles 81 of clamps 75, 77, are then manually tightened to rigidly attach the legs of the bed to arms 61, 63, respectively. The configuration of the clamps 75, 77, shown enables them to rigidly grasp both round and square legs having varying cross-sectional dimensions.

The vehicle may be positioned under the bed in either its extended or contracted condition. Once in place, the two carriage assemblies 21, 23, may be telescoped and locked in the extended position merely by operating the control bar 93.

It can be seen from FIG. 8 that when the carriage assemblies 21, 23, are telescoped into the extended position, the axle of traction wheel 31 is near the longitudinal center of the bed. In FIG. 8, the longitudinal center is represented by the center line 95. The advantage of placing the traction wheel near the center of the bed is that an operator standing at the control bar 93 can easily guide movement of the bed through tight manuevers and around corners without assistance from another person. The length of a hospital bed between the sets of legs at each end thereof is typically 68 to 87 inches, and the combined length of the extended carriage assemblies is such that the axle of the traction wheel 31 located at the forward end of the first carriage assembly is typically within 8 inches on either side of the center line 95.

It can also be seen from FIG. 8 that the vehicle has a low profile, the height, $h$, typically being on the order of 11 inches, so as to permit the vehicle to fit easily under most hospital beds. In addition, substantially the entire vehicle is positioned under the bed, with only the control handle assembly projecting at the end thereof. Thus, the vehicle when in place consumes only a few inches more than the length of the bed itself, thereby permitting use of the vehicle to transport hospital beds in elevators that are not much longer than the bed itself.

Occasionally equipment is attached to one or both ends of the hospital bed for holding a patient in suspension or traction. Such equipment is generally bulky, heavy, and difficult to attach or remove from the bed. Thus, it is desirable to leave the equipment attached to the bed when it is moved from one location to another in a hospital. If traction or suspension equipment were attached to the left end of the bed shown in FIG. 8, the embodiment of the vehicle shown therein would be unsuitable for use in moving the bed because the support member 85 for the control handle extends vertically and would likely conflict with the traction equipment.

The possibility of any interference between the control handle assembly and traction equipment is overcome by the alternative embodiment of the vehicle shown in FIGS. 10 – 13. Referring to FIG. 10, the control handle assembly includes a first tubular member 97 which is fitted into a second tubular socket member 99. These two members are dimensioned for tight frictional engagement between them. As shown in FIGS. 10 and 13, socket member 99 is pivotably mounted on a pin 101 between side support brackets 103 and is positionable in a first vertical position and a second position angled about 10° from the vertical position, as indicated by the phantom outline in FIG. 10. The control handle assembly is locked in its first upright position or the second tilted position by inserting a pin 105 into first or second holes 107, 109, respectively, in the side support bracket 103. Pin 105 may be inserted manually, or alternatively by a spring biased mechanism (not shown) which is operated by the toe of the operator. The 10° tilt of the handle assembly in the second position provides adequate clearance between the control handle and the traction equipment mounted on the end of the bed. However, when the bed and attached vehicle are moved onto an elevator there is often insufficient space inside the elevator to accommodate the additional length caused by the tilted handle assembly. For this reason, the handle assembly is of the break-away type, i.e., it is electrically and mechanically removable from the vehicle itself. Referring to FIGS. 11 and 13, the tubular support member 97 of the control handle assembly may be removed by pulling it against friction out of socket 99. Electrical control cable 111 from the above mentioned switch and rheostat is coupled through a plug 113 and receptacle 115 to cable 117 which leads to the motor control circuitry. When the handle assembly is disengaged from socket 99, the plug 113 and receptacle 115 are separated, thereby electrically disconnecting the handle from the vehicle.

FIG. 14 is a schematic diagram illustrating all electrical components of the vehicle, including the power control circuit. Electric motor 43, storage batteries 47, 49, and plug 51 for the battery charger are shown with the same reference numberals as used hereinabove to describe the placement of these components on the first carriage assembly 21. There are also shown two micro-switches 119, 121 and a variable resistor or rheostat R3, which are contained within the housings formed by portions of the side brackets 89, 91 of the control handle and which are mechanically linked to control bar 93, as described hereinabove. The mechanical linkages are indicated by the dashed lines 116 and 118. The remaining circuitry is contained within housing 45 on the first carriage assembly 21.

Switch S1 is a main power switch and is normally closed when the vehicle is ready for use. The contacts for switches 119, 121, are illustrated for the condition when control bar 93 is in its stable center-off position. Rotation of control bar 93 in the F direction (FIG. 1) causes switch 119 to close, thereby to energize the coil of relay 120. At this time, the coil of a polarity reversing relay 122 is maintained de-energized. A current path is established from the positive terminal of battery 47 through contacts 123 of relay 120 and contacts 125 of relay 122 to motor 43 and thence through relay contacts 127 and a silicon controlled rectifier (SCR) 131 to the negative terminal of battery 49. Current flow is such that motor 43 drives the vehicle in the forward direction.

When control bar 93 is rotated in the R direction, both switches 119, 121, are closed, thereby to energize both relays 120 and 122, so that the current flow through relay contacts 123, 125, 127, is in the reverse polarity sense. As a result, motor 43 is energized in the opposite direction. Whenever control bar 93 is returned to its stable center-off position, both relays 120 and 122 are de-energized, and contacts 129 of relay 120 close to shunt motor 43, thereby to provide dynamic braking.

When motor 43 is energized in either direction, the power applied thereto is controlled by SCR 131. More particularly, SCR 131 is rendered conductive by pulses applied to its control electrode from a conventional unijunction transistor relaxation oscillator circuit contained within the dashed outline block 133. These pulses recur at a frequency that depends on the charging rate of a capacitor C2, which in turn is controlled by rheostat R3. The wiper arm of rheostat R3 is at its center position as shown when control bar 93 is in the center-off position. With this arrangement, the electrical resistance produced by rheostat R3 is maximum at the center-off position of the control bar and decreases with rotation of the bar in either direction. As the control bar is rotated to decrease the resistance of rheostat R3, the capacitor C2 charges more rapidly and unijunction transistor Q2 fires more frequently.

Each time SCR 131 conducts in response to a pulse from the relaxation oscillator circuit 133, the anode electrode of SCR 131 goes low, thereby to activate a second unijunction transistor oscillator circuit contained within the dashed outline block 135 by forward biasing a transistor Q4. This initiates charging of a capacitor C4. When capacitor C4 charges to a predetermined voltage level, unijunction transistor Q3 fires. The resulting pulse is applied to the control electrode of an SCR 137, which in turn is rendered conductive to shunt current away from the anode of SCR 131 through a capacitor C3. This current drain from SCR 131 is sufficient to render it non-conductive.

In continuous operation, SCR 131 conducts a series of current pulses to motor 43, with the pulse rate, and thus the motor speed, being determined by the adjustment of rheostat R3 through rotation of control bar 93. The duration of each pulse is the same and is determined by the components of circuit 135 that control the charging of capacitor C4.

It is claimed:

1. A vehicle for moving a device, said vehicle comprising:
   first and second telescoping carriage assemblies which are positionable under said device in extended and contracted positions relative to one another;
   said first carriage assembly including a traction wheel and power means for driving said traction wheel;
   said second carriage assembly including support wheels, means for attaching the vehicle to the device to be moved, and handle means for guiding said vehicle; carriage
   a pair of spaced apart longitudinally extendable side support brackets, each bracket having one portion affixed to said first carriage assembly and another portion affixed to said second carrriage assembly, thereby to permit said first carriage assembly to telescope toward and away from said second carriage assembly said traction wheel and power means being contained by said first carriage assembly between said side support brackets.

2. The apparatus of claim 1, further including means for locking said first and second carriage assemblies in either of said extended and contracted positions.

3. The apparatus of claim 1, wherein said handle means is removable from said second carriage assembly to thereby reduce the outside dimensions of said vehicle.

4. The apparatus of claim 1, further including means for pivoting said handle means away from said vehicle.

5. The apparatus of claim 1 wherein said handle means includes means for controlling said power means.

6. The apparatus of claim 5 wherein said controlling means includes a dead-man throttle.

7. The apparatus of claim 1, wherein said power means includes:
   an electric motor;
   power transmission means for coupling said motor to said traction wheel;
   a source of electrical power; and
   circuit means for controlling the electrical power applied from said power source to said motor, thereby to control the speed of said motor.

8. The apparatus of claim 7, wherein said electric motor is reversible; said source of electrical power includes a battery; and said circuit means includes means for reversing the polarity of the power from said battery with respect to the input to said motor.

9. The apparatus of claim 7, said handle means having a rheostat control bar electrically coupled to said circuit means, said rheostat control bar being movable against spring bias in first and second directions, thereby to energize said motor and drive said vehicle forward and backward, respectively.

10. The apparatus of claim 9, wherein said handle means includes a main support member and means for separably attaching said support member to said second carriage assembly, thereby to permit removal of said handle from said second carriage assembly.

11. The apparatus of claim 1, wherein the device to be moved is a hospital bed and wherein said attaching means includes a pair of arms mounted on and extending laterally from said second carriage assembly, each of said pair of arms having a clamp mounted thereon for attachment to a leg of the hospital bed when said vehicle is positioned under the bed.

12. The apparatus of claim 11, wherein said clamps are slidable along said arms, thereby to permit adjustment of the clamps to the spacing between the legs of the bed.

13. The apparatus of claim 12, wherein said arms are pivotably mounted on said second carriage assembly, thereby to permit said arms to be rotated upward when not in use.

14. The apparatus of claim 1, wherein said first carriage assembly is supported by a single traction wheel and said second carriage assembly is supported by caster wheels.

15. A powered vehicle positionable under a hospital bed and between the legs at one end thereof for moving the bed, said vehicle comprising:
   first and second telescoping carriage assemblies which are positionable in locked extended and contracted positions relative to one another;
   a pair of spaced-apart longitudinally extendable side support brackets, each bracket having one portion affixed to said first carriage assembly and another portion affixed to said second carriage assembly, thereby to permit said first carriage assembly to telescope toward and away from said second carriage assembly;
   said first carriage assembly including a traction wheel; an electric motor; power transmission means for coupling said motor to said traction wheel; a battery; and circuit means for controlling the electrical power supplied to said motor from said battery, thereby to control the speed of said motor, all of said wheel, motor, transmission means, battery and circuit means being contained by said first carriage assembly between said side support brackets;
   said second carriage assembly including support wheels, a handle including means for manually controlling said circuit means; and a pair of laterally extending arms, each arm having a clamp mounted thereon for attachment to the legs at one end of the hospital bed when the vehicle is positioned between said legs and under the bed;

said first and second carriage assemblies having a longitudinal dimension in said extended position such that said traction wheel is located near the longitudinal center of the bed with reference to the end of the bed to which said clamps are attached.

16. The apparatus of claim 15, wherein said handle is tiltable away from the vehicle and is removable from said second carriage assembly.

17. The apparatus of claim 15, wherein said first carriage assembly is supported by a single traction wheel and said second carriage assembly is supported by caster wheels.

* * * * *